Aug. 14, 1923.  1,464,578

J. B. MORTON

SANITARY BOTTLE HOLDER

Filed March 9, 1922

Inventor,
Joseph B. Morton,
By Howard S. Smith
His Attorney

Patented Aug. 14, 1923.

1,464,578

UNITED STATES PATENT OFFICE.

JOSEPH B. MORTON, OF DAYTON, OHIO.

SANITARY BOTTLE HOLDER.

Application filed March 9, 1922. Serial No. 542,277.

*To all whom it may concern:*

Be it known that I, JOSEPH B. MORTON, a citizen of the United States, residing in the city of Dayton, in the county of Montgomery and State of Ohio, have invented certain new and useful Improvements in Sanitary Bottle Holders, of which the following is a specification.

The principal object of my invention is to provide a sanitary bottle holder or trap to receive and protect from dirt and other impurities filled and empty bottles. Bottles containing milk, for instance, when left on porches by milkmen, are exposed to unsanitary conditions unless these bottles, and the empty ones which they are to replace, are suitably covered.

My invention contemplates the provision of a simple and efficient device which permits the insertion of an empty or a filled bottle in one compartment to automatically cover it and at the same time to uncover another compartment containing a bottle to be withdrawn. Thus, when a milkman arrives at the home of one of his customers, he will drop the filled bottle in one compartment of the holder with sufficient force to cause my improved opening means to uncover the other compartment containing the empty bottle and thereafter to cover the compartment that receives the filled bottle. The filled bottle will then be protected from dirt and other unsanitary factors, and in cold weather the liquid contained therein will not be so likely to freeze.

Figure 2:
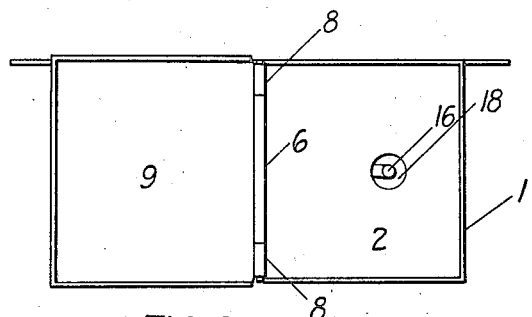
Figure 1:
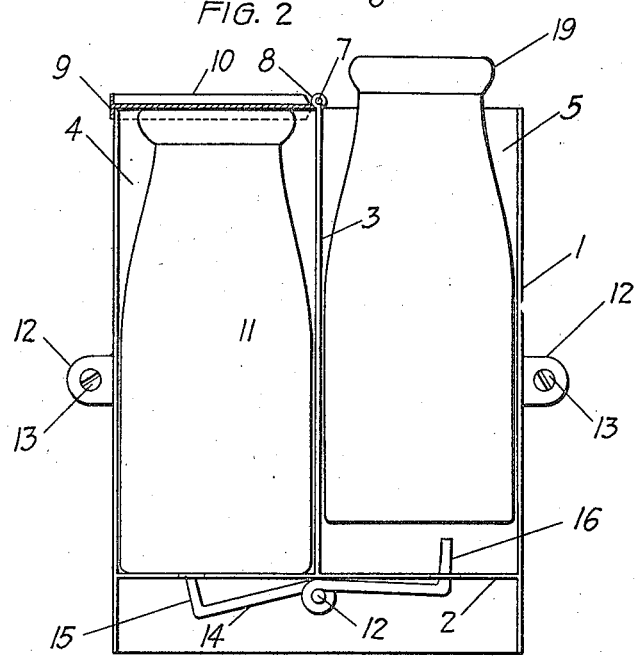
Figure 3:
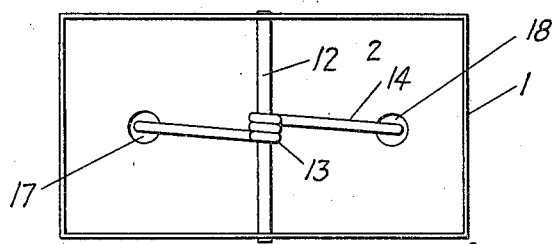

In the accompanying drawings, Figure 1 is a side elevational view of my sanitary bottle holder, with one side removed to show a milk bottle in one compartment thereof. Figure 2 is a top plan view of said holder. And Figure 3 is a bottom plan view thereof.

Throughout the specification and drawings, similar reference characters denote corresponding parts.

Referring to the accompanying drawings, the numeral 1 designates a holder that is preferably rectangular in cross section and constructed of suitable metal. Provided in the holder or casing 1 a short distance above its lower edges, is a bottom 2 from the middle portion of which there projects upwardly in contact with the side walls, a partition 3 for dividing said holder into two compartments 4 and 5 respectively. (See Figure 1).

The partition 3 terminates at its top in a knuckle portion 6 which receives a hinge pin 7 whose ends loosely project into two knuckle portions 8, 8 of a lid or cover 9 of a size to cover the top of either of the compartments 4 or 5 after a bottle has been placed therein. The lid 9 preferably has a double flange 10 on each free edge thereof in order that it may fit snugly over the top of the compartment which it is desired to cover. (See Figures 1 and 2).

In Figure 1 there is shown a filled milk bottle 11 in the compartment 4 of the holder 1, covered by the hinged lid 9. When so placed and covered within said compartment, the bottle will be protected from dirt or other unsanitary factors to which it is exposed on the porch of a residence, and in cold weather the possibility of the milk becoming frozen while so enclosed is diminished. Provided on the end walls of the holder are apertured ears 12, 12 through which screws 13, 13 may be passed to firmly secure said holder to a wall or other support in a convenient position for inserting the bottles therein, and withdrawing them therefrom.

When a bottle is inserted in one compartment of the holder, the following means are provided for automatically enabling said bottle to cause the bottle in the other compartment to violently force the hinged lid 9 from the top of the latter over the compartment into which the first bottle is being inserted. Extending from each side wall of the holder 1 a short distance beneath the bottom 2 thereof, is a pin 12. Encircling the middle portion of the latter is the coiled part 13 of an impact element 14 constructed of spring metal. This element terminates in two upturned ends 15 and 16 which are adapted to freely enter holes 17 and 18 respectively in the bottom 2 of the holder 1.

When a bottle is enclosed in one compartment of the holder 1, as for example the compartment 4, it will be supported by the base 2 in a position to be engaged by the upturned end 15 of the impact element 14. Now when a bottle 19 is dropped into the compartment 5 of the holder 1, it will strike the upturned end 16 of the impact element 14 with sufficient force to cause its other upturned end 15 to move through the hole 17 in the bottom 2 to engage and raise the bottle 11 with sufficient violence to cause its top to throw the hinged lid 9 to a position over the top of the compartment 5 into which the bottle is dropped. In Figure 1 the bottle 19 is shown in a position just before it strikes the impact element 14. The bottle 11, which in this instance is the filled one, may now be withdrawn, while the other bottle, which is the empty one, will be covered by the lid 9 to protect it until it is removed by the milkman on his next round. When the milkman next arrives, he will drop a full bottle into the compartment 4 to cause the impact element 14 to raise the empty bottle with sufficient force to throw the hinged lid 9 to a position over the top of the compartment 4 to protect the full bottle until it is removed by the housewife.

The impact element 14 is constructed of spring material so as to cushion the shock of the descending bottle's engagement with it, thereby protecting against breakage the descending bottle as well as the one which it violently elevates.

I do not with to be limited to the details of construction and arrangement herein shown and described, and any changes or modifications may be made therein within the scope of the subjoined claims.

Having described my invention, I claim:

1. The combination with a bottle holder, of a partition dividing said holder into two compartments, a lid adapted to cover the top of either compartment, hingedly secured to the top of said holder, and means adapted to be engaged by a bottle when inserted in one compartment, to engage and raise the bottle in the other compartment into forceful contact with said lid, whereby the latter may be thrown to a position over the top of the compartment in which the first bottle is inserted.

2. The combination with a bottle holder, of a partition dividing said holder into two compartments, a lid adapted to cover the top of either compartment, hingedly secured to the top of said holder, a lever pivotally secured in the bottom of said holder, and a bottle-supporting member above said lever and having a hole beneath each compartment through which one end of said lever is adapted to be forced to engage and raise the bottle in said compartment into contact with said lid, when the other end of said lever is engaged by a descending bottle in the other compartment, for the purpose specified.

3. The combination with a bottle holder, of a partition dividing said holder into two compartments, a lid adapted to cover the top of either compartment, hingedly secured to the top of said partition, a transverse pin secured to the bottom of said holder, an impact element pivotally secured at its middle portion to said pin, an upturned portion on each end of said impact element, and a bottle-supporting member above the impact element and having a hole beneath each compartment through which one upturned end of the impact element is adapted to be forced to engage and raise the bottle in said compartment into contact with said lid, when the other upturned end of said lever is engaged by a descending bottle in the other compartment, for the purpose specified.

In testimony whereof I have hereunto set my hand this 28th day of February, 1922.

JOSEPH B. MORTON.

Witness:
HOWARD S. SMITH.